United States Patent [19]

Priem

[11] Patent Number: 5,754,866
[45] Date of Patent: May 19, 1998

[54] DELAYED INTERRUPTS WITH A FIFO IN AN IMPROVED INPUT/OUTPUT ARCHITECTURE

[75] Inventor: Curtis Priem, Fremont, Calif.

[73] Assignee: Nvidia Corporation, Sunnyvale, Calif.

[21] Appl. No.: 921,846

[22] Filed: Sep. 2, 1997

Related U.S. Application Data

[63] Continuation of Ser. No. 437,174, May 8, 1995, abandoned.

[51] Int. Cl.$^6$ .................................................. G06F 9/46
[52] U.S. Cl. ........................................ 395/733; 395/868
[58] Field of Search ................................ 395/733, 867, 395/877, 734, 735, 736, 739, 250

[56] References Cited

U.S. PATENT DOCUMENTS

| | | | |
|---|---|---|---|
| 4,099,255 | 7/1978 | Stanley et al. | 395/733 |
| 4,449,182 | 5/1984 | Rubinson et al. | 395/250 |
| 4,758,950 | 7/1988 | Cruess et al. | 395/733 |
| 4,823,312 | 4/1989 | Michael et al. | 395/250 |
| 4,935,894 | 6/1990 | Ternes et al. | 395/287 |
| 4,995,056 | 2/1991 | Fogg, Jr. et al. | 375/7 |
| 5,159,447 | 10/1992 | Haskell et al. | 358/133 |
| 5,175,732 | 12/1992 | Hendel et al. | 370/94.1 |
| 5,241,660 | 8/1993 | Michael et al. | 395/250 |
| 5,287,458 | 2/1994 | Michael et al. | 395/250 |
| 5,307,459 | 4/1994 | Petersen et al. | 395/200.1 |
| 5,363,506 | 11/1994 | Fukuoka | 395/733 |
| 5,423,049 | 6/1995 | Kurihara | 395/725 |
| 5,437,047 | 7/1995 | Nakamura | 395/800 |
| 5,506,993 | 4/1996 | Fitch et al. | 395/800 |
| 5,552,744 | 9/1996 | Kobayakawa et al. | 395/200.1 |

*Primary Examiner*—Ayaz R. Sheikh
*Assistant Examiner*—David A. Wiley
*Attorney, Agent, or Firm*—Stephen L. King

[57] ABSTRACT

Apparatus for transferring commands over a system transmission path between first and second components in a digital data system including a first-in first-out circuit having a plurality of stages arranged in the system transmission path, circuitry for generating a first signal to indicate that a component to which a command in the FIFO circuit is directed is unable to handle an operation commanded, and a delay circuit responsive to the first signal for causing the generation of an interrupt request signal after a preselected time.

11 Claims, 2 Drawing Sheets

DELAYED INTERRUPTS WITH A FIFO IN AN IMPROVED INPUT/OUTPUT ARCHITECTURE

This application is a continuation of application Ser. No. 08/437,174, filed May 8, 1995, now abandoned.

BACKGROUND OF THE INVENTION

1. Field of the Invention

This invention relates to electronic circuitry and, more particularly, to electronic circuitry used to improve the flow of data in first-in first-out (FIFO) circuits used for data transfer operations.

2. History of the Prior Art

First-in first-out (FIFO) circuits are often used for controlling the transfer of data in electronic circuits such as computer circuits. For example, FIFO circuits are often used to buffer data transfers between components on a data bus in a computer system. By buffering data transfer operations, a component of a system transferring data to another component may transfer data without the component receiving the data needing to be ready to handle the data when it is transferred. The FIFO circuit may continue to receive a number of different segments of data serially from the sending component and furnish the data segments in the same serial order to the receiving component as the receiving component is able to utilize those data segments.

Components of data systems use both hardware and software to handle data. Typically hardware operations use circuitry specifically designed to accomplish a limited number of specific operations and are very fast while software operations are used to handle less usual operations and are relatively slow. Consequently, when a component which includes a FIFO circuit in its input channel utilizes hardware to handle the data it receives, it is often able to rapidly use up the data segments which have been furnished to the FIFO circuit. On the other hand, when a component which includes a FIFO circuit in its input channel must use software to handle the data segments which it receives, the use of data in the FIFO circuit proceeds much more slowly. One reason that software operations proceed more slowly is because for a software operation to be initiated in a uniprocessor system it is necessary to utilize the processor which is sending data to the FIFO circuit in order to run the software process for the component to which the data is being sent. To accomplish this, the processor must be interrupted, clear whatever operation it is presently involved in, and switch to the software process required by the receiving component. Another reason is that software processes typically require memory accesses to obtain an interrupt service routine required for the operation. These operations obviously require substantially more time than operations which continue in hardware.

It has been found that, in many systems, operations which are processed in hardware and operations which are processed in software both tend to appear in long sequences. One reason for this is that software operations are typically used in setting up and terminating operations by components while hardware operations are typically used after setup has taken place until a process has been completed. Because software operations tend to appear in long sequences, when one software operation has been completed, it is likely that the next operation will also be a software operation which will require another interrupt to the processor and another slow operation at the receiving component. Since a large number of software operations are likely to occur in sequence, the commands for these software operations will tend to be processed more slowly causing the number of commands in a FIFO input circuit to increase in number. However, when the first of a sequence of software commands occurs, the command immediately preceding that command must have been a hardware command; and it is likely that a number of commands before that command were also hardware commands. Consequently, when a first software command in a sequence occurs, it is likely that the FIFO circuit will be nearly empty because the hardware processing unit receiving the commands from the FIFO circuit may have been processing commands faster than the FIFO can be filled by the central processing unit. Because of this, only a single or a few software commands will exist in the FIFO unit when it is interrupted; and the cost of the interrupt which is very substantial must be borne by only one or a few commands.

It is very desirable to provide an arrangement for decreasing the delay imposed by software processing in transferring data utilizing a FIFO circuit.

SUMMARY OF THE INVENTION

It is, therefore, an object of the present invention to provide circuitry for increasing the performance of circuitry used in the transfer of data between components in a digital system.

These and other objects of the present invention are realized by circuitry associated with FIFO circuit which detects whether a string of commands are to be executed in software, and delays the generation of an interrupt to the software processes to allow time for the FIFO circuit to fill whereby a longer sequence of software commands is likely to be available in the FIFO circuit when the interrupt occurs.

These and other objects and features of the invention will be better understood by reference to the detailed description which follows taken together with the drawings in which like elements are referred to by like designations throughout the several views.

Notation And Nomenclature

Some portions of the detailed descriptions which follow are presented in terms of symbolic representations of operations on data bits within a computer memory. These descriptions and representations are the means used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to a method and apparatus for operating a computer in processing electrical or other (e.g. mechanical, chemical) physical signals to generate other desired physical signals.

DETAILED DESCRIPTION

Figure 1:
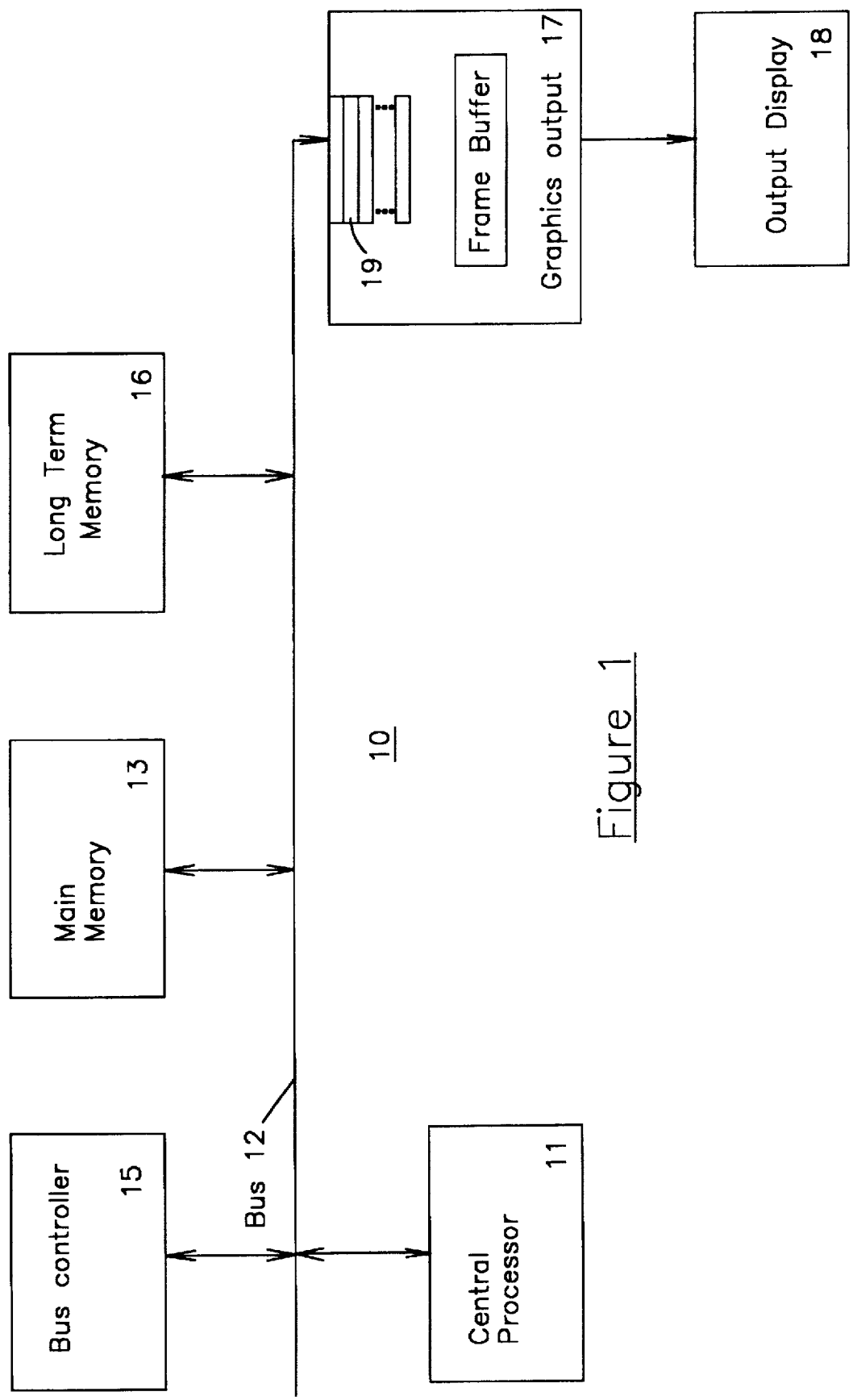
FIG. 1 is a block diagram of a computer system which may include the present invention.

Referring now to FIG. 1, there is illustrated a block diagram of a computer system 10 configured to utilize the present invention. The system 10 includes a central processing unit 11 which executes the various instructions provided to control the operations of the system 10. The central processing unit 11 is joined to a bus 12 adapted to carry information between the various components of the system 10. Joined to the bus 12 is main memory 13 which is typically constructed of dynamic random access memory arranged in a manner well known to those skilled in the prior art to store information during a period in which power is provided to the system 10.

Also connected to the bus 12 are various peripheral components such as long term memory 16 and circuitry such as a graphics output control device 17 which may include a frame buffer to which data may be written that is to be transferred to an output device such as a monitor 18 for display.

Various other well known input/output devices may be joined to the bus 12 in a manner well known to those skilled in the art. Any of these input/output devices may be joined to the bus through a first-in first-out (FIFO) circuit such as the circuit 19 illustrated which joins the graphics output control device 17 to the bus 12. Such a FIFO circuit 19 is typically used so that data being transferred to the input/output device may be buffered and need not be handled immediately upon receipt at the input to the input/output device. This allows operations which vary in the length of time they require for processing to be handled without the need to cause the processor to stop sending additional commands and relinquish the bus, a process which significantly delays system operations. It also assures that a next command is almost always available without delay to an input/output device handling a long sequence of commands.

In digital systems such as computer systems based on the IBM personal computer, each input/output device indicates that it requires the central processor (or some other processor) to service a request which cannot be handled by the input/output device through the generation of an interrupt signal. Each time an input/output device requires a processor to run software to accomplish a particular operation which is not performed by the hardware of the input/output device, such an interrupt request must be generated. An interrupt request is typically generated by hardware in the input/output device which includes a detection circuit and circuitry for generating the request. The request is transferred to an interrupt controller associated with the processor. The interrupt controller (or controllers) determines the sequence in which interrupts from different devices are handled. An interrupt request causes the processor to temporarily suspend execution of the particular process it is currently running, store the state for that interrupted process, obtain the interrupt service routine for the interrupt which has been generated, and run that routine. The interrupt service routine is specially adapted to perform the software operation which the input/output device is unable to accomplish in hardware. As will be understood, each interrupt is costly in processing time because of the need to accomplish all of these operations, among other things. It has been determined that in a particular system the cost of an interrupt is approximately four microseconds, while the processing of an instruction by the input/output device hardware averages about forty nanoseconds. This would allow about one hundred instructions to be processed in hardware during the four microseconds time taken for each interrupt.

Figure 2:
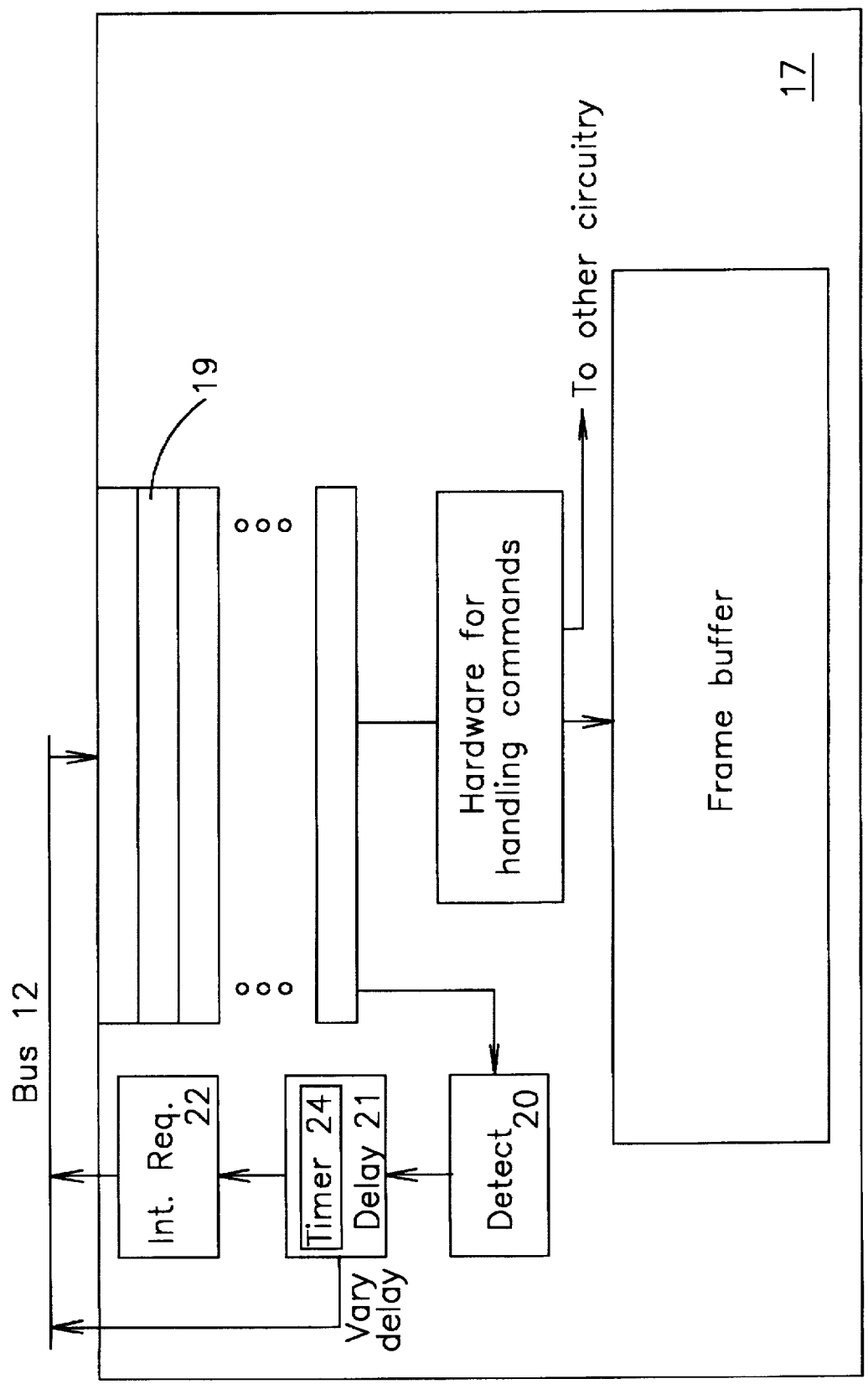
FIG. 2 is block diagram illustrating in detail the system of FIG. 1 used in implementing the present invention.

In order to reduce the cost of the interrupts needed to process a mix of software operations and hardware operations in a system including a FIFO where the software and hardware operations typically occur in long sequences, the present invention (as shown in FIG. 2) transfers the signal which would normally initiate an interrupt request from detection circuitry 20 to a delay circuit 21. The delay circuit 21 delays the interrupt request (from interrupt request generating circuitry 22) which would initiate the processing of a software operation for a period sufficient to allow the central processing unit to fill the FIFO unit. Since it is very probable that a long sequence of software commands will follow any initial software command which generates an interrupt request, this allows the cost of the interrupt to be distributed over the larger number of software commands which will probably fill the FIFO unit.

The delay is inserted in the circuitry of the input/output device in order to allow the FIFO to fill. It has been estimated from a study of the operation of a particular system that an average of eight commands will have been queued in a FIFO capable of holding a total of thirty-two commands from the time an interrupt request is initiated until the processor sending the commands is interrupted to service the request. A delay in accordance with the invention which allows filling the FIFO (e.g., with thirty-two commands) is to be contrasted with the typical arrangement in which approximately eight commands exist in the FIFO circuit and the cost of the delay for the interrupt is distributed over this smaller number of commands.

The delay circuit 21 includes a timer 24 which is chosen in one embodiment to provide from one to four microseconds of delay before signaling the circuitry 22 to cause the interrupt to be generated and transferred to the operating system. This period of time is sufficient to allow the FIFO circuit to fill with the additional commands. The timer then sends a signal to the circuitry 22 which generates an interrupt request to the operating system to allow the central processing unit to run the interrupt handler to process the software operation at the head of the FIFO. Once the interrupt handler has control of the central processing unit, it has sufficient priority that it is able to continue control of the central processing unit and execute any software commands in the FIFO circuit which may follow the initial command which triggered the interrupt without the need to interrupt the central processing unit further. This has the effect of amortizing the time for a single interrupt over a much larger total of commands rather than the average eight commands which are expected to exist in the particular FIFO circuit. This allows the time required for interrupts to be reduced by approximately four times.

The actual manner in which this is accomplished is as follows. The FIFO unit 19 includes a hardware circuit 20 which determines whether an interrupt is required or not. Such circuitry is common to all input/output devices used in computer systems based on the IBM personal computer and are well known to those skilled in the art.

When the circuit determines that an interrupt is required, that is, that the next operation must be accomplished in software, then the circuit generates a signal which will typically cause an interrupt request to be generated and sent to the central processing unit. If an interrupt is required, the signal generating the interrupt is sent instead to the delay circuit 21. At the delay circuit 21, the timer 24 provides a specified period (which may be variable) sufficient to allow the central processing unit to fill the FIFO unit completely. Then the interrupt request is generated by the circuit 22 Ultimately, this causes the interrupt controller and operating system to begin the process of switching the central processing unit from the process presently being run to the interrupt service routine necessary to service the interrupt generated by the input/output device.

In one embodiment of the invention, the interrupt service routine may be designed to handle commands in the FIFO 19 so long as commands directed to software are available. Typically, in a system in which software commands and hardware commands appear in long sequences, this will include all of the commands in the FIFO unit 19. However, there may be instances in which a command to be implemented in hardware appears in the series of commands in the FIFO. In such a case, the interrupt routine may hand the operation back to the hardware of the input/output device (such as graphics output device 17) so that hardware may take over the operation of handling commands from the bottom of the FIFO unit 19.

Since there may be situations in which the next command after a single hardware command will be another series of software commands, in another embodiment of the invention, the hardware is essentially locked out of the operation once a software command has been handed to the interrupt handler until the FIFO has been completely cleared of commands. This eliminates the problem of a series of interrupts where only a few hardware commands are interspersed with a series of software commands. The interrupt handler may hand feed the commands in the FIFO unit 19 to the hardware for handling commands in the input/output device in the same manner as does the hardware. Those commands which only the interrupt handler is able to execute will be executed by the interrupt handler while those commands which may be carried out by the hardware for handling commands may be transferred by the interrupt handler to this hardware as each appears in the sequence. In another embodiment, the interrupt handler continues to handle all of the operations in the FIFO unit 19 and hands off those operations which are easy for the hardware for handling commands to accomplish until the FIFO is completely empty. In yet another embodiment, the interrupt handler continues to handle all of the operations in the FIFO unit 19 but emulates those operations which are normally handled by the hardware for handling commands until the FIFO is completely empty whether those operations would normally be hardware or software operations. In this manner, a single hardware operation does not cause the entire software interrupt process to begin over again.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. Apparatus for transferring commands over a system transmission path between first and second components in a digital data system comprising:

a first-in first-out (FIFO) circuit having a plurality of stages arranged in the system transmission path for buffering commands sent over the transmission path, circuitry for generating a first signal to indicate that a component to which a command in the FIFO circuit is directed is unable to handle an operation commanded, a delay circuit responsive to the first signal for causing the generation of an interrupt request signal after a preselected time selected to allow the FIFO circuit to load additional commands into space available in the FIFO circuit when the first signal is generated.

2. Apparatus for transferring commands as claimed in claim 1 in which the preselected time is variable.

3. Apparatus for transferring commands as claimed in claim 1 in which the FIFO circuit, the circuitry for generating a first signal, and the delay circuit are a part of a particular input/output device.

4. Apparatus for transferring commands as claimed in claim 1 in which the FIFO circuit includes thirty-two stages, and the preselected time may vary from one to four microseconds.

5. A computer system comprising:

a central processing unit;

a system bus;

main memory; and apparatus for transferring commands over the system bus between first and second components comprising:

a first-in first-out (FIFO) circuit having a plurality of stages arranged in the system transmission path for buffering commands sent over the transmission path, circuitry for generating a first signal to indicate that a component to which a command in the FIFO circuit is directed is unable to handle an operation commanded, a delay circuit responsive to the first signal for causing the generation of an interrupt request signal after a preselected time selected to allow the FIFO circuit to load additional commands into space available in the FIFO circuit when the first signal is generated.

6. A computer system as claimed in claim 5 in which the preselected time is variable.

7. A computer system as claimed in claim 5 in which the FIFO circuit, the circuitry for generating a first signal, and the delay circuit are a part of a particular input/output device.

8. A computer system as claimed in claim 5 in which the FIFO circuit includes thirty-two stages, and the preselected time may vary from one to four microseconds.

9. A method of controlling the transfer of commands over a system transmission path in a digital data system between first and second components including a first-in first-out (FIFO) circuit having a plurality of stages for buffering commands sent over the transmission path comprising the steps of:

generating a first signal to indicate that a component to which a command in the FIFO circuit is directed is unable to handle an operation commanded, delaying the first signal for a preselected time selected to allow the FIFO circuit to load additional commands into space available when the first signal is generated, and generating an interrupt request signal in response to the delayed first signal after the preselected time.

10. A method as claimed in claim 9 in which the preselected time is sufficient to allow all stages of the FIFO circuit to fill with commands.

11. A method as claimed in claim 9 comprising the additional step of executing all commands in the FIFO circuit in response to a single interrupt request.

* * * * *